(12) United States Patent
Siméon et al.

(10) Patent No.: US 9,915,360 B2
(45) Date of Patent: Mar. 13, 2018

(54) ELECTROMAGNETIC VALVE FOR HIGH-PRESSURE CRYOGENIC GAS

(71) Applicant: Techspace Aero S.A., Herstal (Milmort) (BE)

(72) Inventors: Bernard Siméon, Angleur (BE); Cédric Frippiat, Jehanster (BE); Olivier Dellis, Liege (BE); Antoine Delille, Pontillas (BE)

(73) Assignee: SAFRAN AERO BOOSTERS SA, Herstal (Milmort) (BE)

( * ) Notice: Subject to any disclaimer, the term of this patent is extended or adjusted under 35 U.S.C. 154(b) by 243 days.

(21) Appl. No.: 14/839,271

(22) Filed: Aug. 28, 2015

(65) Prior Publication Data
US 2016/0153568 A1 Jun. 2, 2016

(30) Foreign Application Priority Data
Nov. 28, 2014 (EP) .................................... 14195474

(51) Int. Cl.
*F16K 11/056* (2006.01)
*F16K 31/08* (2006.01)
(Continued)

(52) U.S. Cl.
CPC .............. *F16K 11/056* (2013.01); *F16K 1/14* (2013.01); *F16K 11/161* (2013.01);
(Continued)

(58) Field of Classification Search
CPC ...... F16K 11/056; F16K 1/14; F16K 31/0606; F16K 31/0631; F16K 31/082;
(Continued)

(56) References Cited

U.S. PATENT DOCUMENTS 3,378,031 A * 4/1968 Hatashita ............ F16K 31/0631
137/596.17
3,970,111 A * 7/1976 Brune ..................... B60T 8/364
137/596.17
(Continued)

FOREIGN PATENT DOCUMENTS

DE 102007010213 B3 8/2008
FR 2284077 A1 4/1976

OTHER PUBLICATIONS

Search Report dated Jun. 4, 2015 from European Patent Appl. No. 14195474.3.

*Primary Examiner* — Eric Keasel
(74) *Attorney, Agent, or Firm* — James E. Walton

(57) ABSTRACT

The present application relates to an electromagnetic valve, in particular for high-pressure cryogenic gas for a rocket. The valve includes a body in which a passage is formed connecting an inlet to an outlet, a seat communicating with the passage, a ball sealing the seat when the valve is at rest, a magnetic circuit with a coil, a magnetic shell, and a plunger displacing the ball relative to the seat thereof in order to open and/or close the seat. The plunger is telescopic, i.e., extendable and retractable. The plunger includes two ferromagnetic portions that are movable relative to one another and relative to the passage. The portions are fitted one inside the other and define air gaps E2 and E3 therebetween. The valve includes a magnet and a spring on either side of a secondary portion to hold the secondary portion in the closed position, distancing a ball from the exhaust seat.

20 Claims, 4 Drawing Sheets

(51) Int. Cl.
   *F16K 11/16*      (2006.01)
   *F16K 31/06*      (2006.01)
   *F16K 1/14*       (2006.01)

(52) U.S. Cl.
   CPC ...... *F16K 31/0606* (2013.01); *F16K 31/0631* (2013.01); *F16K 31/082* (2013.01)

(58) Field of Classification Search
   CPC ..... Y10T 137/86582; Y10T 137/86614; Y10T 137/87217
   USPC .................................................. 137/596.17
   See application file for complete search history.

(56) References Cited

U.S. PATENT DOCUMENTS

| | | | | |
|---|---|---|---|---|
| 4,538,129 A * | 8/1985 | Fisher | ................... | F16K 31/082 251/129.21 |
| 4,619,289 A * | 10/1986 | Tsuru | ...................... | B60T 8/364 137/596.17 |
| 5,218,996 A * | 6/1993 | Schmitt-Matzon | ....... | B60T 8/36 137/596.17 |
| 5,950,984 A * | 9/1999 | Anderson | ........... | F16K 31/0637 137/596.17 |
| 6,026,860 A * | 2/2000 | Teichmann | ............. | F16K 31/06 251/129.1 |
| 6,874,533 B2 * | 4/2005 | Weber | ................. | F15B 13/0405 137/596.17 |
| 8,322,376 B2 * | 12/2012 | Ho | ..................... | F16K 31/0606 137/596.17 |

* cited by examiner

ELECTROMAGNETIC VALVE FOR HIGH-PRESSURE CRYOGENIC GAS

This application claims priority under 35 U.S.C. § 119 to European Patent Application No. 14195474.3, filed 28 Nov. 2014, titles "Electromagnetic Value for High-Pressure Cryogenic Gas," which is incorporated herein by reference for all purposes.

BACKGROUND

1. Field of the Application

The present application relates to the field of electromagnetic valves. More precisely, the present application relates to a ball-type electromagnetic valve for controlling a fuel feed, in particular for a propellant feed in a space aircraft.

2. Description of Related Art

A rocket is propelled with the aid of a fuel (propellant), which is contained in on-board tanks. To supply the engines in a precise manner, solenoid valves are associated with the tanks. These valves generally have electromagnetic actuators utilizing the current from the electrical network of the rocket, the actuators having to adapt to the available voltage and intensity.

In order to hold open an electromagnetic valve, it is necessary to energize the coil thereof continuously. However, the current circulating here heats the temperature of the valve as a result, in some cases up to 100° C., which may cause the fuel to ignite. It goes without saying that this situation is to be avoided at all costs.

The fuel is propellant circulating in gaseous form at a temperature reaching −200° C. and a pressure of approximately 400 bar. This pressure exerts significant forces on the seal elements, as do the vibrations of a rocket during take-off. These vibrations may lead to accelerations of 60 g, which speed up the wear of the seal surfaces together with the impacts of closing movements. In the case of a ball cooperating with a seat, the closing movement generally causes the seat to absorb the kinetic energy of the plunger of the electromagnetic valve. For balls of reduced size, this leads to work-hardening of the seat and to a flattening of the ball tappet. During closing cycles the tappet does not move the ball sufficiently away from its seat, and the desired flow is not available in the absence of sufficient passage section. In addition, the degradation of the seat reduces the nominal tightness. It is therefore of interest to propose a valve with a ball that is pushed from its seat from the corresponding orifice.

Document DE 102007010213 B3 presents a valve to be actuated electromagnetically. The valve comprises a primary seat closed by a seal, which is in turn provided with a secondary seat to balance the pressures during opening. This secondary seat is closed with the aid of a ball which is held closed by a spring and which is opened thanks to a needle pushed by the plunger housed in the solenoid. The opening movement of the ball is performed through the seat, which makes it possible to prevent the ball from grinding against its seat during closure thereof. In this configuration the only kinetic energy absorbed by the seat is that of the ball and of the spring. However, this valve has an abrupt actuation of the ball. In addition, the elongate form of the valve exposes it in particular to vibrations on account of the inertia of the suspended portions Although great strides have been made in the area of electromagnetic valves, many shortcomings remain.

DETAILED DESCRIPTION OF THE PREFERRED EMBODIMENT

Figure 1:
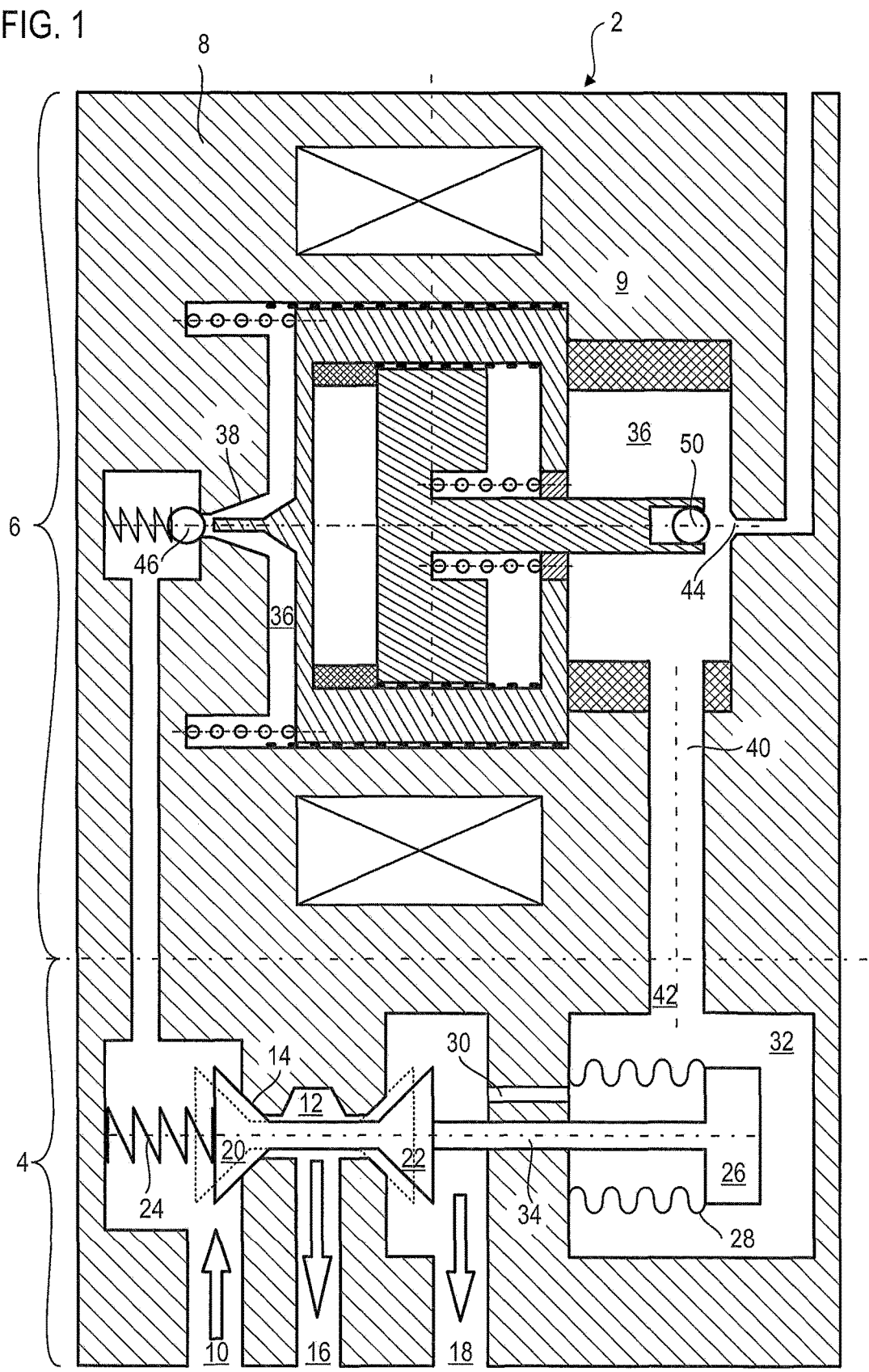
FIG. 1 shows an electromagnetic valve according to the present application.

The present application aims to overcome at least one of the problems posed by the prior art. More precisely, the object of the present application is to propose a solution to replace the prior art. A further object of the present application is also to reduce the impacts in the valve during actuation thereof whilst maintaining the operational safety thereof.

The present application relates to an electromagnetic valve, in particular for cryogenic gas, the valve comprising: a passage connecting an inlet to an outlet; a seat with a sealing ball associated with the inlet; a seat with a sealing ball associated with the outlet; a magnetic circuit with a coil and a plunger cooperating with the balls so as to displace the balls relative to the seat thereof so as to open and/or close the valve; noteworthy in that the plunger comprises two magnetic portions movable relative to one another under the effect of the magnetic field generated by the coil so as to displace each ball to open and/or close relative to the seat thereof asynchronously.

The present application also relates to an electromagnetic valve in particular for cryogenic gas, the valve comprising: a passage connecting an inlet to an outlet; a seat associated with the passage; a ball cooperating with the seat so as to be able to seal the passage; a magnetic circuit with a coil and a plunger displacing the ball from the seat thereof so as to open and/or close the passage; noteworthy in that the plunger comprises two magnetic portions movable relative to one another and actuatable by a magnetic flux generated by the coil in the magnetic circuit.

In accordance with an advantageous embodiment of the present application the magnetic portions of the plunger each comprise a ferromagnetic material and are surrounded by the coil, possibly over the majority of the length of at least one or each of the portions.

In accordance with an advantageous embodiment of the present application the magnetic portions slide one inside the other, one of the portions preferably comprising an annular cavity in which the other of the two portions is displaced.

In accordance with an advantageous embodiment of the present application at least one or each magnetic portion comprises an elongate part in the direction of displacement of the plunger, the, or each, elongate part cooperating with the ball so as to be able to push said ball and/or so as to be able to pull said ball.

In accordance with an advantageous embodiment of the present application one of the magnetic portions comprises a sealing part of the seat with a cavity in which the ball or at least one ball is introduced and/or the other of the two portions has a needle configured to push the ball or at least one ball.

In accordance with an advantageous embodiment of the present application the portions are a primary portion and a secondary portion, the primary portion possibly having a diameter greater than that of the secondary portion, and/or the secondary portion having an axial length greater than that of the primary portion.

In accordance with an advantageous embodiment of the present application the primary portion is disposed further upstream in the passage, and the secondary portion is disposed further downstream in the passage, the mass of the secondary portion possibly being less than the mass of the primary portion.

In accordance with an advantageous embodiment of the present application the valve comprises a secondary permanent magnet disposed between the magnetic portions of the plunger, possibly within the primary portion.

In accordance with an advantageous embodiment of the present application the valve comprises a secondary spring disposed between the magnetic portions of the plunger so as to distance these, the secondary magnet and the secondary spring possibly being disposed on opposite faces of the secondary portion.

In accordance with an advantageous embodiment of the present application the valve comprises a spring holding the ball in a closed position, the ball being disposed between said spring and the plunger, and the primary portion pushing the ball out of the seat thereof as the coil is energized.

In accordance with an advantageous embodiment of the present application the valve comprises two autoclave balls each actuated by one of the magnetic portions.

In accordance with an advantageous embodiment of the present application the seat is an inlet seat and the ball is an inlet ball, the valve preferably also comprising an exhaust disposed in the passage on the same side of the primary portion as the outlet, the exhaust possibly comprising an exhaust seat in communication with the inlet seat via the passage, and an exhaust ball able to seal the exhaust seat.

In accordance with an advantageous embodiment of the present application the valve comprises a primary spring and a primary permanent magnet suitable for holding the primary portion in a downstream position, the primary portion preferably being disposed between the primary spring and the primary magnet.

In accordance with an advantageous embodiment of the present application the passage is a management passage and the valve also comprises a fluid distribution level in communication with the management passage, the distribution level comprising a distribution passage, a distribution inlet with a seat, and a distribution outlet with a seat, two valves opening and closing selectively the distribution inlet seat and the distribution outlet seat.

In accordance with an advantageous embodiment of the present application the distribution valves are controlled by a distribution piston in communication with the management passage, possibly via the outlet of the management passage, the inlet of the management passage preferably communicating with the distribution inlet independently of the opening or closing of the valve.

In accordance with an advantageous embodiment of the present application the valve is a high-pressure valve. High pressure may mean that the valve is suitable for fluids of a pressure greater than 50 bar, preferably greater than or equal to 200 bar, more preferably greater than or equal to 400 bar.

In accordance with an advantageous embodiment of the present application the magnetic portions are disposed in the passage, in particular the management passage, the magnetic portions preferably being configured so as to be able to move in translation freely relative to one another.

In accordance with an advantageous embodiment of the present application the, or each, seat has a diameter less than or equal to 2.00 mm, preferably less than 1.20 mm.

In accordance with an advantageous embodiment of the present application the, or each, ball has a diameter less than or equal to 3.50 mm, preferably less than 2.00 mm, more preferably less than 1.60 mm.

In accordance with an advantageous embodiment of the present application the magnetic circuit comprises a magnetic shell encasing the magnetic portions.

In accordance with an advantageous embodiment of the present application at least one of the magnetic portions comprises an orifice or a groove on the outer surface thereof to allow a fluid to pass from one face to the other of said plunger portion.

The advantageous embodiments of each subject of the present application are generally also applicable to the other subjects of the present application.

The division of the plunger makes it possible to phase the action thereof, i.e. to have three steps during displacements of portions of the plunger and/or to have three magnetic flux values passing through the plunger. Following the energizing of the coil, the flux may rise progressively in the magnetic circuit, and the force exerted by the plunger on the ball or on each ball may develop over time.

The present application in addition makes it possible to control a supply port, an outlet, and an exhaust port with the aid of a single coil. The proposed solution requires only a reduced number of parts, which limits the uncertainty of the control of each ball as a result of dispersions in the side chains. Splitting the plunger reduces the mass of each portion in movement, which limits the impacts. Thanks to the amplitude gain of the telescopic plunger, the size thereof can be reduced, as can the size of the shell and of the coil. The spatial requirement is thus reduced advantageously.

In the following description the axial direction corresponds to the direction of displacement of the portions of the plunger.

FIG. 1 shows a valve 2 with electrical actuation, more precisely with electromagnetic and mechanical actuation. The valve 2 makes it possible to manage a flow of a pressurized fluid, which for example is gaseous. The valve 2 is shown here in a closed state, the valve adopting said state in the absence of electrical supply. However, the valve could be configured so as to remain open at rest and to close again when energized.

The valve 2 comprises a distribution level 4 managing the distribution of the fluid and a management level 6, or control level 6, controlling the distribution level 4. The valve 2 may comprise a body 8, which is possibly common to the two levels or alternatively is formed in two parts. The body 8 may comprise a ferromagnetic shell 9 making it possible to form a magnetic circuit in the management level 6. The valve has an inlet 10 common to the distribution level 4 and to the management level 6.

The distribution level 4 comprises a distribution passage 12 connecting a distribution inlet 14 with a seat, and a distribution outlet 16 or user port. Said outlet 16 is provided with a seat. The distribution passage 12 optionally comprises an exhaust 18, the outlet 16 being between the inlet 14 and the exhaust 18. The distribution level 4 also comprises distribution valves (20; 22) cooperating with the seats of the distribution level 4 so as to seal said seats. The valves (20; 22) are fixed to one another and are held in the closed position thanks to a spring 24. Following displacement thereof, the valves (20; 22) occupy an open position, shown by a dashed line, in which the inlet valve 20 opens the seat thereof whilst the exhaust valve 22 closes the seat thereof.

The distribution valves (20; 22) are controlled by a distribution piston 26, which is actuated by the pressure of the pressurized fluid of the valve 2. The piston 26 may be a piston 26 with a bellows 28, or may be a piston inserted into a bore of corresponding diameter. The interior of the bellows 28 may be in communication with the nearest exhaust 18 with the aid of an orifice 30. The piston 26 is housed in a chamber 32 in which the pressure variations cause said piston to move in translation, this movement in translation being communicated to the valves (20; 22) via a rod 34. The pressure in the chamber 32 of the piston is controlled by the management level 6. The piston 26 ensures a mechanical, pneumatic/hydraulic actuation.

The management level 6 comprises a management passage 36 connecting a management inlet 38 to a seat, and at least one management outlet 40. The management outlet 40 is in hydraulic communication with the piston 26 of the distribution level 4 via a conduit 42. Thus, when the management level 6 opens, the pressure at the inlet 10 of the valve 2 is exerted onto the piston 26 and displaces said piston. The management inlet 38 and the distribution inlet 14 are connected by a channel, which in turn leads from the primary inlet 10 of the valve 2.

The management passage 36 may optionally comprise a management exhaust 44 with a seat, the management outlet 40 being between the management inlet 38 and the management exhaust 44. The management exhaust 44 is advantageous in that the pressure on the piston 26 decreases when the management level 6 is disconnected and in that the inlet valve 20 seals the inlet seat of the distribution level 4 so as to no longer distribute fluid.

Figure 2:
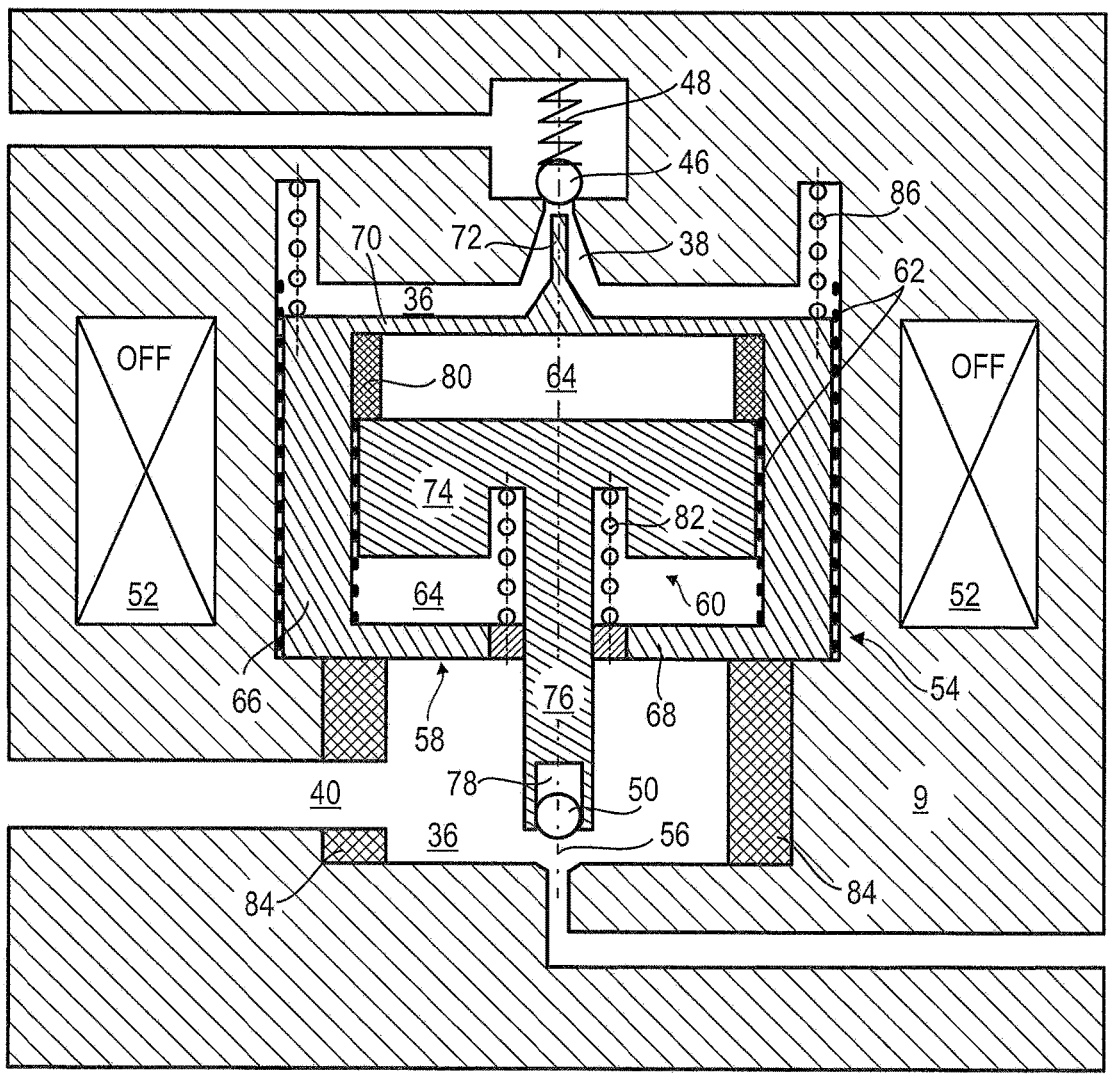
FIG. 2 shows the management portion of the electromagnetic valve in a closed position according to the present application.

FIG. 2 shows the management level 6 in the closed position, at rest, when the valve 2 is not electrically supplied. The closed state of the management level 6 can be obtained by sealing the inlet thereof and/or by sealing the outlet thereof.

The management inlet 38 comprises an inlet ball 46 making it possible to close said inlet. The ball 46 may be disposed upstream of the inlet seat such that the pressure of the fluid holds said ball shut, thus making the ball autoclave in nature. A spring 48 may be involved in this closure effect. The choice of a ball 46 is advantageous because this element can be produced with strict tolerances of sphericity, more specifically in the micrometer range, which limits leakages. The ball 46 may be impacted on the seat thereof in order to deform said seat, such that the seal interface is better tailored. The management exhaust 44 may comprise a ball 50 upstream of the seat in order to seal said seat so that the pressure can contribute to the placement of the ball on the seat thereof. In the shown state the exhaust ball 50 is spaced from the seat thereof such that the two faces of the piston remain at the exhaust pressure, that is to say at a pressure equilibrium. The balls (46; 50) can be made of ceramic material in order to increase the durability and limit the inertia thereof. The diameter of said balls may be equal to 1.59 mm, and the diameter of the orifices of the corresponding seats may be equal to 1.12 mm. These dimensions limit both the mass and the effects of the pressure of the fluid on the balls, which oppose said pressure during opening.

In accordance with an alternative of the present application the arrangement of the outlet and exhaust conduits of the management level can be reversed. Likewise, instead of being at the exhaust, the exhaust ball can be provided at the outlet, or a third ball can be added.

The management level 6 comprises magnetic actuation means. It may comprise a coil 52, which possibly surrounds the management passage 36. The coil 52 may comprise a number of units, a number of solenoids disposed axially side by side, and/or fitted one inside the other. The coil 52 can be disposed between the inlet 38 and the outlet 40 of the management level 6. The management passage 36 may also be surrounded by the magnetic shell 9 forming the magnetic circuit, and said passage 36 can generally pass through the shell 9.

The management level 6 comprises a plunger 54, which is disposed inside the coil 52 and in the management passage 36, where it is subjected to the magnetic flux of the magnetic circuit. The plunger 54 may comprise a ferromagnetic material so as to direct magnetic flux field lines. The plunger 54 is movable, and the displacements thereof make it possible to open and close the management level 6.

The plunger 54 is telescopic, i.e. it is both extendable and retractable. The movements of said plunger are performed parallel to the axis 56 of the solenoid 52. For this purpose, the plunger comprises at least two magnetic portions (58; 60), of which one is a primary portion 58 and one is a secondary portion 60. The magnetic portions (58; 60) are both movable relative to the management passage 36 and are movable relative to one another. The primary portion 58 slides in the management passage 36, in contact with a lining 62 which limits sticking. The portions (58; 60) cooperate magnetically with one another and are integrated in the magnetic circuit, and the same field line of the circuit can pass through each portion. The portions (58; 60) are hinged to one another with the aid of a mechanical link, for example a slide link or a sliding pivot link.

The portions (58; 60) may be in contact with one another or may be in contact via a lining 62 in order to avoid magnetic sticking of said portions, which would disturb the kinematics thereof. The portions (58; 60) generally have cylindrical forms, but could also have quadrangular sections. Two magnetic portions (58; 60) are presented, however it is possible to arrange three or more magnetic portions which cooperate together.

The primary portion 58 may extend further upstream towards the management inlet 38 and may have the greatest width and/or the greatest mass. It has a generally cylindrical shape or tubular shape with an inner cylindrical cavity 64. It is delimited by an annular wall 66 and two discs, of which one is a perforated downstream disc 68 and the other is an upstream disc 70 with a needle 72 making it possible to push the inlet ball 46 from the seat thereof.

The secondary portion 60 has a body with a ferromagnetic cylindrical portion 74 and a bar 76 extending the cylindrical portion 74. The bar 76 may have, downstream, a cavity 78 housing the exhaust ball 50, the mouth of the cavity 78 having a shoulder or a narrowing in order to block the ball in the cavity so as to be able to lift said ball from the seat thereof.

The magnetic portions (58; 60) slide one inside the other, the primary portion 58 surrounding the secondary portion 60. The annular wall 66 encases the cylindrical portion 74 of the secondary portion 60, the discs (68; 70) of the primary portion 58 axially delimiting said cylindrical portion 74. The primary portion 58 may have an inner stop 80 limiting the displacement of the secondary portion, the stop 80 possibly being a secondary permanent magnet 80, which also makes it possible to hold the secondary portion 60 upstream. A secondary spring 82 may also make it possible to push the secondary portion 58 downstream, conversely. The secondary spring 82 and the secondary magnet 80 are advantageously disposed within the cavity 64 of the primary portion 58, on opposite faces of the cylindrical portion 74 of the secondary portion 60, and act in the same direction.

The management level 6 also comprises a primary permanent magnet 84 which is disposed downstream of the management passage 36 and which may have a circular shape. It holds the primary portion 58 in the closed position, set back relative to the seat of the management inlet 38. In addition a primary spring 86 draws the primary portion 58 towards the primary magnet 84, in a downstream direction, such that said primary portion remains in the closed position.

Figure 3:
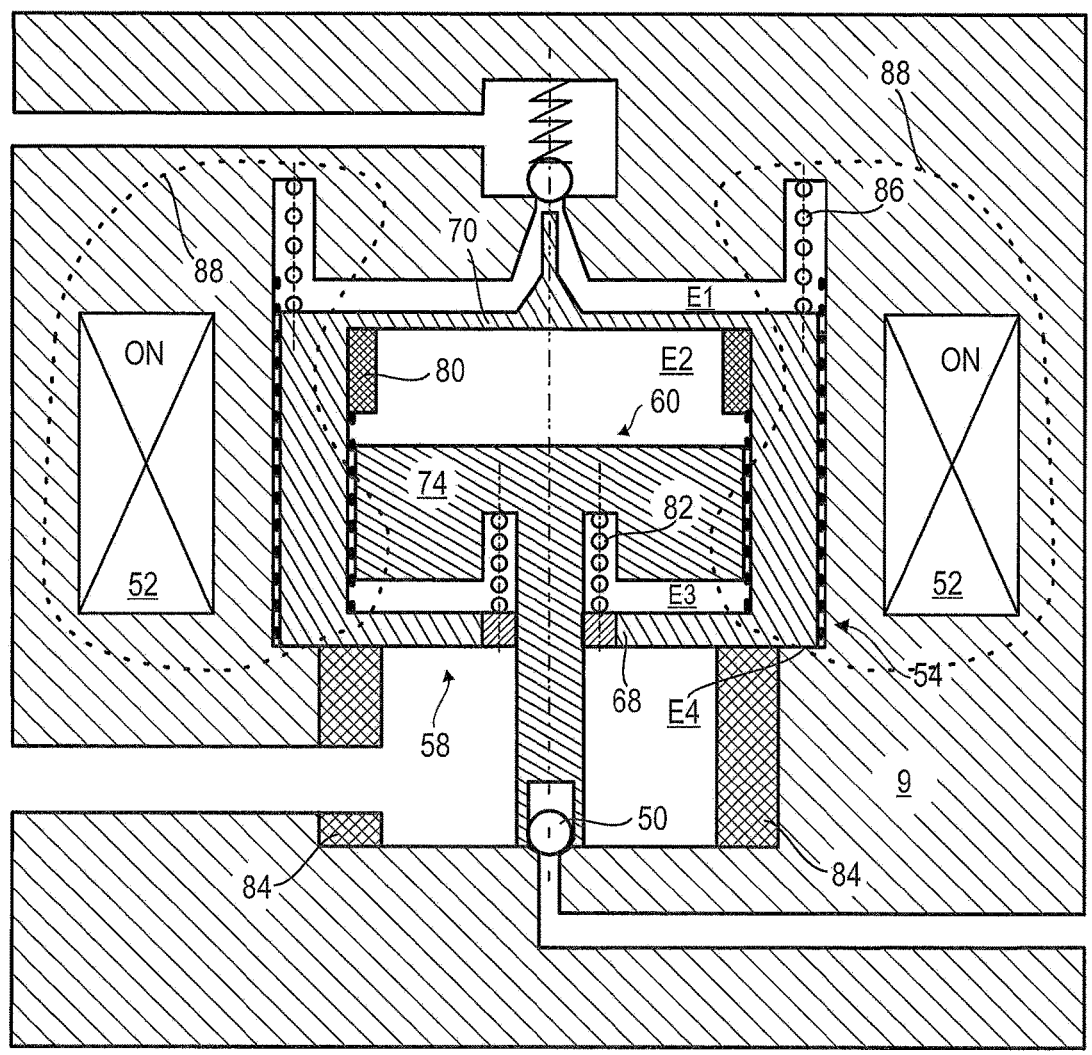
FIG. 3 shows the management portion of the electromagnetic valve in an intermediate position according to the present application.

FIG. 3 shows the management level 6 in an intermediate step of the opening movement of the management level 6, when the coil 52 is energized. Here, the plunger 54 retreats relative to the closed position.

When the coil 52 is energized, a magnetic flux 88 appears in the magnetic circuit. The flux 88 circulates in the shell 9 and passes through the plunger 54, the magnetic flux 88 in particular passing through the magnetic portions (58; 60). The magnetic flux 88 creates magnetic forces at air gaps E1, E2, E3, E4, which are presented in accordance with the flow direction. These air gaps are divided between the shell and the plunger 54. The air gap E1 is between the shell 9 and the upstream face of the primary portion 58, for example the upstream disc 70 thereof. The air gap E2, which is closed at rest, is between the upstream disc 70 and the cylindrical portion 74 of the secondary portion 60. The air gap E3 is between the cylindrical portion 74 of the secondary portion 60 and the downstream disc 68. The air gap E4, which is closed at rest and in the present intermediate state, is between the shell 9 and the downstream face of the primary portion 60, for example the downstream disc 68 thereof. In order to allow a displacement of the secondary portion 60 in the primary portion 58, it may be necessary for the spacing of the air gap E3 to be less than the spacing of the air gap E2 since the flux passage sections 88 thereof may be similar.

The magnetic portions (58; 60) are configured such that the air gap E3 reduces first, so as to displace the secondary portion 60 before the primary portion 58. To do this, it is necessary to optimize the mass of the portions, the width of the air gaps, the sections of the air gaps, the size and position of the magnets (80; 84), the rigidity and the preload of the springs (82; 86), the passage sections of the flux 88 in the ferromagnetic portions (58; 60), and the ferromagnetic materials used. The section of the air gaps is understood to mean the surface through which the flux 88 passes.

Upon activation of the coil 52, the magnetic force opposes the retaining forces of the secondary spring 82 and of the secondary magnet 80. The secondary portion 60 is displaced downstream, reducing the air gap E3. The secondary portion 60 may rest the exhaust ball 50 on the seat thereof so as to seal the management exhaust 44. Of course, the displacement of the secondary portion 60 may modify the magnetic flux 88 in the primary portion 58.

Figure 4:
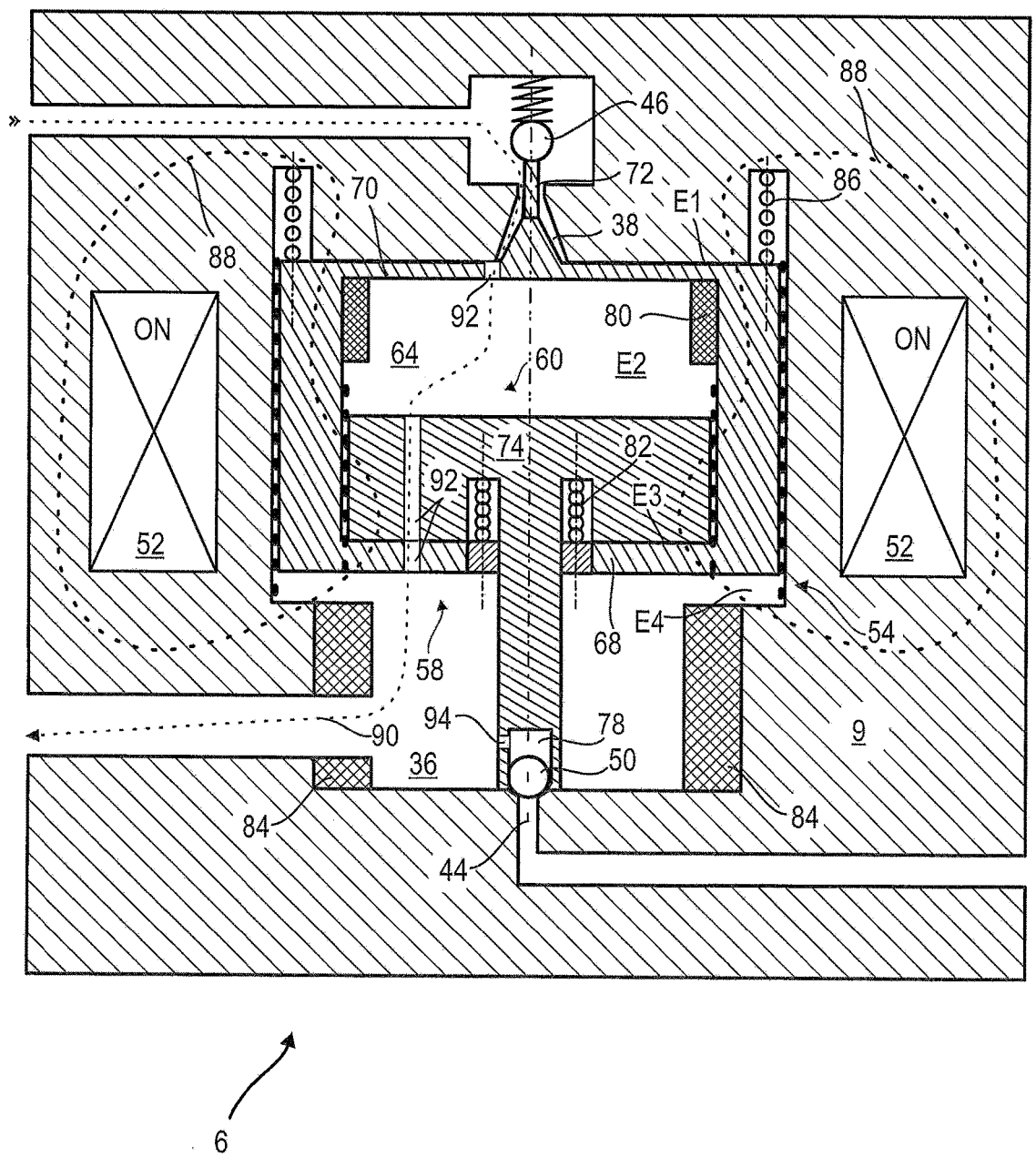
FIG. 4 shows the management portion of the electromagnetic valve in an open position according to the present application.

FIG. 4 shows the open position of the management level 6. The plunger 54 is deployed axially relative to the closed position.

After having displaced the secondary portion 58 relative to the primary portion 60, the latter moves relative to the management passage 36. The primary portion 58 moves upstream, reducing the air gap E1 and also reducing the air gap E3, in particular closing said air gap. The upstream disc 70 of the primary portion 60 may be contacted against the upstream wall of the management passage 36 in which the management inlet 38 is formed, and/or the downstream disc 68 of the primary portion 58 may come into abutment against the downstream face of the cylindrical portion 74 of the secondary portion 60. The air gap E4 becomes larger during the last opening phase of the management level 6.

As it moves upstream, the primary portion 60 pushes the inlet ball 46 by means of the tappet thereof, in the present case the needle 72. The inlet ball 46 is lifted from the seat thereof and allows a circulation of fluid 90 through the passage 36. The pressure of the fluid 90 is communicated from the inlet 38 to the outlet 40, and in particular to the piston actuating the valves of the distribution level in order to open the distribution inlet.

The fluid may pass through or may bypass the plunger 54. In particular, the fluids may pass through or may bypass each magnetic portion (58; 60). The fluid 90 may circulate via the cavity 64 of the primary portion. The portions (58; 60) may have orifices 92 passing through the discs (68; 70) of the cylindrical portion 74 of the secondary portion. Axial grooves may be formed on the annular wall of the primary portion and/or on the outer surface of the cylindrical portion of the secondary portion. Grooves can be formed on the inner wall delimiting the management passage, for example so as to bypass the primary portion.

It is noted here that the circulation is provided towards the outlet and not towards the exhaust, since this was closed previously by the ball 50 thereof. An orifice 94 can be provided in the cavity 78 in order to place the exhaust ball 50 further against the seat thereof. In the absence of the orifice 90, the bar 76 of the secondary portion 58 can ensure a seal around the exhaust.

Whilst the electrical current supplies the coil 52, the portions (58; 60) remain in the open configurations thereof. By disconnecting the electrical supply, the magnetic forces produced by the coil 52 in the circuit decrease, and may disappear. The effects of the springs (82; 86) and of the magnets (80; 84) draw the magnetic portions (58; 60) into rest positions, such as those in FIG. 2. The spring and/or the primary magnet may be stronger than their secondary counterparts, for example such that the primary portion 58 returns to rest first, which makes it possible to close the inlet ball 46 before opening the exhaust ball 50. This precaution makes it possible to limit the loss of fluid via the exhaust.

We claim:

1. An electromagnetic valve for cryogenic gas, comprising:
   an inlet;
   an outlet;
   a passage connecting the inlet to the outlet;
   a seat associated with the passage;
   a ball cooperating with the seat configured to seal the passage; and
   a magnetic circuit comprising:
   a coil generating a magnetic flux in the magnetic circuit; and
   a magnetic plunger displacing the ball from the seat thereof so as to manage the flow through the passage, the magnetic plunger comprising:
   two magnetic portions placed in the magnetic circuit, the two magnetic portions being movable relative to one another, and being actuated by a magnetic flux, wherein one of the two magnetic portions includes a perforated disc, and the other of the two magnetic portions includes a bar crossing the perforated disc and displacing the ball from the seat thereof so as to manage the flow through the passage.

2. The electromagnetic valve in accordance with claim 1, wherein the magnetic portions of the magnetic plunger each comprise:
   a ferromagnetic material and are surrounded by the coil.

3. The electromagnetic valve in accordance with claim 1, wherein at least one magnetic portion is surrounded by the coil over the majority of its length.

4. The electromagnetic valve in accordance with claim 1, wherein the magnetic portions slide one inside the other, one of the portions comprising:
an annular cavity in which the other of the two portions is displaced.

5. The electromagnetic valve in accordance with claim 1, wherein at least one magnetic portion comprises:
an elongate part in the direction of displacement of the magnetic plunger, the elongate part cooperating with the ball so as to be able to push the ball.

6. The electromagnetic valve in accordance with claim 1, wherein at least one magnetic portion comprises:
an elongate part in the direction of displacement of the magnetic plunger, the elongate part cooperating with the ball so as to be able to pull the ball.

7. The electromagnetic valve in accordance with claim 1, wherein one of the magnetic portions comprises:
a sealing part adapted for sealing the seat around the ball, the sealing part including a cavity in which the ball is disposed.

8. The electromagnetic valve in accordance with claim 1, wherein one of the magnetic portions comprises:
a needle configured to push the ball.

9. The electromagnetic valve in accordance with claim 1, wherein the portions are a primary portion and a secondary portion, the primary portion having a diameter greater than that of the secondary portion, and the secondary portion being longer than the primary portion.

10. The electromagnetic valve in accordance with claim 9, wherein the primary portion is disposed further upstream in the passage, and the secondary portion is disposed further downstream in the passage, the mass of the secondary portion being less than the mass of the primary portion.

11. The electromagnetic valve in accordance with claim 9, further comprising:
a primary spring and a primary permanent magnet suitable for holding the primary portion in a downstream position, the primary portion being disposed between the primary spring and the primary magnet.

12. The electromagnetic valve in accordance with claim 1, further comprising:
a secondary spring disposed between the magnetic portions of the magnetic plunger so as to create a distance therebetween.

13. The electromagnetic valve in accordance with claim 9, further comprising:
a spring for holding the ball in a closed position, the ball being disposed between the spring and the magnetic plunger;
wherein the primary portion pushes the ball out of the seat thereof as the coil is energized.

14. The electromagnetic valve in accordance with claim 1, wherein the ball is a first ball, the valve further comprising:
a second ball, the first ball and said second ball being autoclave balls, and each being actuated by one of the magnetic portions.

15. The electromagnetic valve in accordance with claim 1, wherein the seat is an inlet seat and the ball is an inlet ball, the valve further comprising:
an exhaust disposed in the passage on the same side as the outlet, the exhaust comprising:
an exhaust seat in communication with the inlet seat via the passage; and
an exhaust ball configured to seal the exhaust seat.

16. The electromagnetic valve in accordance with claim 1, further comprising:
a secondary permanent magnet disposed between the magnetic portions of the magnetic plunger.

17. The electromagnetic valve in accordance with claim 1, wherein the passage is a management passage, the valve further comprising:
a fluid distribution level in communication with the management passage, the distribution level comprising:
a distribution passage;
a distribution inlet with a seat;
a distribution outlet with a seat; and
two valves opening and closing selectively the distribution inlet seat and the distribution outlet seat.

18. The electromagnetic valve in accordance with claim 17, wherein the distribution valves are controlled by a distribution piston in communication with the management passage, the inlet of the management passage communicating with the distribution inlet independently of the opening or closing of the valve.

19. An electromagnetic valve for cryogenic gas, comprising:
an inlet;
an outlet;
a passage connecting the inlet to the outlet;
a seat associated with the passage;
at least one ball cooperating with the seat so as to be able to seal the passage; and
a magnetic circuit comprising:
a coil generating a magnetic flux in the magnetic circuit; and
a magnetic plunger for displacing the ball from the seat thereof so as to manage the flow through the passage;
wherein the magnetic plunger comprises:
two magnetic portions movable relative to one another and actuated by the magnetic flux, one of the two magnetic portions contacting the at least one ball, the other of the two magnetic portions being spaced from the at least one ball,
one of the magnetic portions comprising a sealing part including a cavity in which the at least one ball is disposed, said sealing part engaging the seal in addition to the ball in order to shut off the seat.

20. A cryogenic electromagnetic valve, comprising:
an inlet;
an outlet;
a passage connecting the inlet to the outlet;
an inlet seat associated with the inlet;
an inlet ball associated with the inlet seat;
an outlet seat associated with the outlet;
an outlet ball associated with the outlet seat;
a magnetic circuit comprising:
a coil; and
a plunger cooperating with the balls so as to displace the balls relative to the seats thereof so as to open and close the passage;
wherein the plunger comprises:
an inlet magnetic portion associated with the inlet ball;
an outlet magnetic portion associated with the outlet ball;
the inlet magnetic portion having an outermost diameter which is greater than that of the outlet magnetic portion, and the outlet magnetic portion being longer than the inlet magnetic portion,
wherein the movable magnetic portions are movable relative to one another under the effect of the magnetic field generated by the coil so as to displace each ball to open and close relative to the seat thereof asynchronously.

\* \* \* \* \*